Jan. 27, 1970     C. G. SONTHEIMER     3,492,569
BRIDGE CIRCUIT NETWORK FOR MEASUREMENT OF
REFLECTION COEFFICIENTS
Filed July 21, 1966

INVENTOR
CARL G. SONTHEIMER
BY James and Franklin
ATTORNEY

United States Patent Office 3,492,569
Patented Jan. 27, 1970

3,492,569
BRIDGE CIRCUIT NETWORK FOR MEASUREMENT OF REFLECTION COEFFICIENTS
Carl G. Sontheimer, Weston, Conn., assignor to Anzac Electronics, Inc., Norwalk, Conn., a corporation of Connecticut
Filed July 21, 1966, Ser. No. 566,838
Int. Cl. G01r 27/04
U.S. Cl. 324—58
4 Claims

ABSTRACT OF THE DISCLOSURE

A reflectance bridge in which the values of resistance in the two substantially identical arms of the bridge bear specific relationship to the impedance values of the standard impedance in the third arm of the bridge and with resistance values of resistors connected substantially in shunt with the standard impedance and the test impedance, whereby the frequency range over which the bridge can accurately be used is greatly increased.

---

Figure 1:
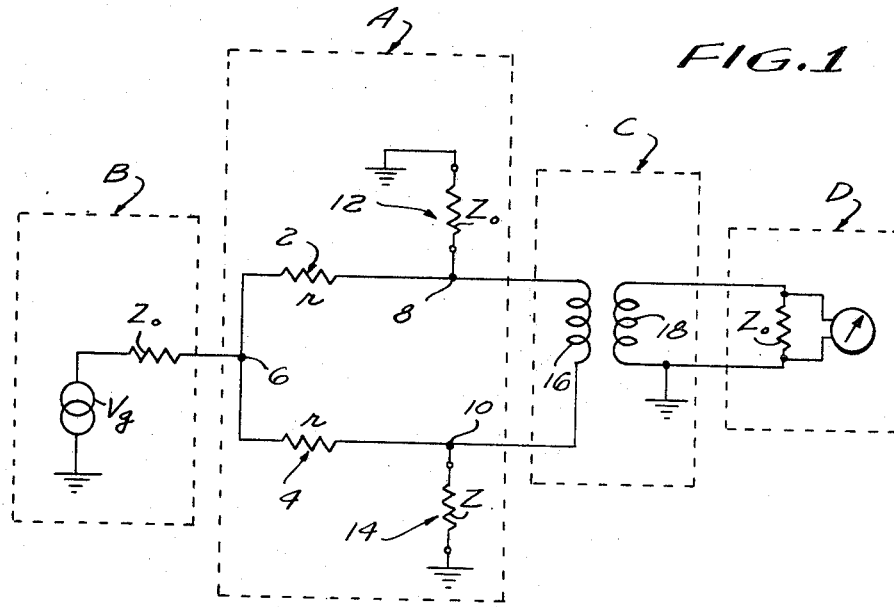

The present invention relates to an improvement in bridge circuit networks designed to measure reflection coefficients and related characteristics, such as standing wave ratio.

With high frequency energization, such as that in the megacycle per second range, most circuits exhibit, to a greater or lesser degree, certain transmission line characteristics. Standing waves are set up within the circuit, and sometimes a proportion of the energy fed into the circuit is reflected back therefrom. The proportion of voltage fed into the circuit which is thus reflected back is the reflection coefficient of the circuit, generally represented by the letter R. It is sometimes also referred to in terms of return loss. It is related to standing wave ratio ($k$) by the expression $R=(K-1)/(K+1)$. The optimum condition for any circuit is to have a reflection coefficient of zero; this signifies that none of the energy fed into the circuit is reflected back therefrom. A reflection coefficient of 1 indicates that all of the energy fed into the circuit is reflected back therefrom. A transmission line which is open-circuited at its remote end will have a reflection coefficient of 1. If that line is short circuited at its remote end it will have a reflection coefficient of $-1$, indicating that the reflected voltage is 180° out of phase with the incident voltage at the shorted end of the line.

It is desirable to be able to measure the reflection coefficient of a given impedance. This is usually done by utilizing a bridge circuit network having a first pair of similar arms and a second pair of arms which are defined by a standard impedance having reflection coefficient of zero and by the impedance the reflection coefficient of which is to be measured respectively. When the bridge is properly designed the voltage signal across appropriate terminals of the bridge will be proportional to the reflection coefficient of the impedance being measured. The accuracy of measurement depends upon the accurate and proper design of the bridge and the magnitudes of the resistors and impedances employed in the bridge, all as is well known.

Because of the frequency-sensitivity of the circuit elements employed, and particularly the means for connecting the bridge network to an indicating means, standard bridge circuit networks are effective only over a relatively narrow frequency range. It has long been known that the effective frequency range of a given network of the type under discussion can be greatly extended through the use of special high frequency transformers for connecting the indicating means to the appropriate bridge terminals. One such transformer which produces excellent results insofar as extending the effective frequency range of the network is concerned is a transmission line transformer surrounded by ferrite beads or the like, and with a compensating inductor connected thereto and defined by a single lead which also passes through ferrite beads or the like.

However, one drawback in the use of such transmission lines transformers or other wide frequency range connecting means is that they introduce an appreciable degree of inaccuracy into the measurement of the reflection coefficient of the impedance, particularly when the measured reflection coefficient is of appreciable magnitude. For example, in a bridge network designed for measuring reflection coefficient over a frequency range between 3 and 1500 megacycles per second, an error of greater than 2 db has been produced in the past between measurements taken respectively with open circuit and short circuit termination of the unit under test. This error derived, it is believed, from losses in the ferrite elements which surrounded the transmission line transformer and the compensating inductor, these losses appearing in the circuit as resistance shunts to ground around the standard impedance and the impedance under test.

It is the prime object of the present invention to devise a bridge circuit network which will have all of the wide-frequency-range attributes of previously known networks designed for the measurement of reflection coefficients, but which will be considerably more accurate than prior art networks, and which in particular will substantially eliminate the error due to the losses in the transformer or other coupling device which connects the bridge to the indicating means.

Under optimum circumstances the measurement of reflection coefficient, disregarding the sign thereof, should be the same whether the impedance under test is open circuited or short circuited at its remote end. As has been indicated, with devices of the prior art an error of greater than 2 db has been experienced as between these two conditions, representing approximately a 25% error. With the teachings of the present invention that error is practically unmeasurable at low frequencies up to about 100 megacycles per second, and at higher frequencies up to 1500 megacycles per second, typically is approximately 0.5 db, a 6% error. There is thus a very great increase in accuracy at high reflection coefficients when the present invention is practised.

This marked increase in accuracy is achieved by determining, for a given installation, the shunting effect of the losses in the transformer or other means which couples the bridge circuit to the indicating device and modifying the magnitude of the parameters of the two resistance arms of the bridge to compensate therefor. The inaccuracy-producing effect of the transformer is translated into the value of the effective resistance which shunts the standard impedance and the impedance under test, and the values of the resistance arms of the bridge are changed in accordance with a mathematical relationship which is explained below.

Figure 2:
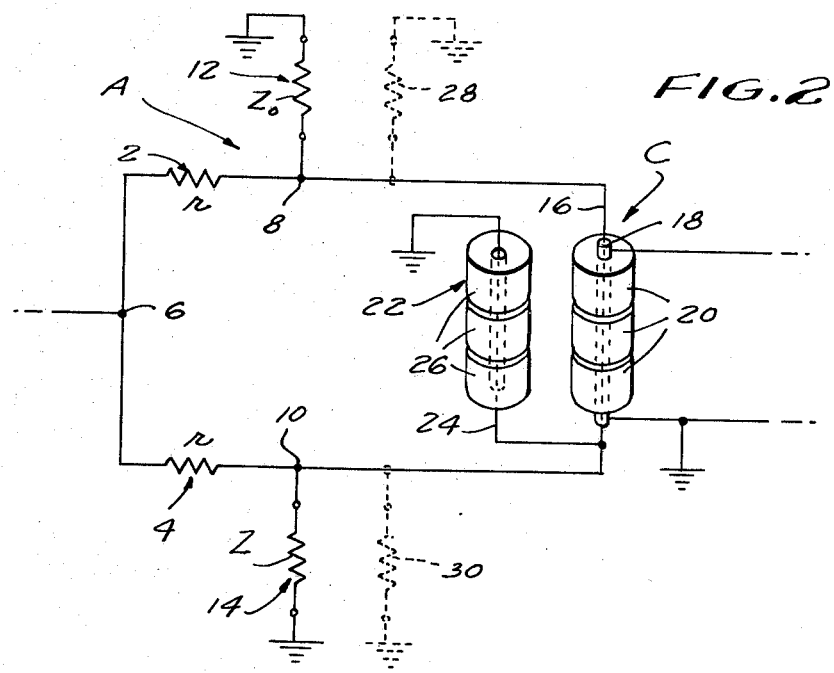

To the accomplishment of the above, and to such other objects as may hereinafter appear, the present invention relates to the construction of a bridge circuit network especially designed for measuring reflection coefficient, as defined in the appended claims and as described in this specification, taken together with the accompanying drawings, in which:

FIG. 1 is a schematic circuit diagram of a typical embodiment of the present invention, the transformer which couples the bridge circuit to the indicating device being shown only symbolically; and FIG. 2 is a circuit diagram of the transformer portion of the circuit of FIG. 1, with a specific transformer embodiment being semi-schematically disclosed.

In order to measure the reflection coefficient of an impedance Z, it is connected in a bridge circuit generally designated A. That circuit comprises a pair of arms 2 and 4 connected together at one end at 6 and terminating at their other ends at terminals 8 and 10 respectively. The arms 2 and 4 are defined by resistors having a resistance value $r$. The other two arms 12 and 14 of the bridge are connected betwen the points 8 and 10 respectively and ground. Arm 12 is defined by a standard impedance having a reflection coefficient of zero and an impedance of $Z_0$, while arm 14 is defined by the impedance Z to be tested. The bridge is designed to be energized by a matched power source generally designated B connected between ground and the bridge terminal 6, the power source B producing an alternating voltage $V_g$ and having a source impedance $Z_0$.

The output from the bridge is derived across points 8 and 10 located between the arms 2, 12 and 4, 14 respectively. The output is connected by a transformer or other coupling means generally designated C to an output indicator generally designated D of any suitable type, the output indicator D being matched in impedance to the bridge A, and therefore having an effective impedance $Z_0$, as indicated, when the turns ratio of the transformer C is $n:n$.

As may be seen from FIG. 2, the transformer C may comprise a transmission line transformer having coaxially related inner and outer lines 16 and 18 respectively which pass through one or more bead-like elements 20 of highly magnetically permeable material such as ferrite, a compensating inductor generally designated 22 being connected between one end of the inner coaxial line 16 and ground and comprising a lead 24 which passes through one or more bead-like elements 26 of highly magnetically permeable material such as ferrite. Losses are produced in the ferrite elements 20 and 26, which losses appear in the circuit as resistances 28 and 30 respectively connected between bridge terminals 8 and 10 and ground, thereby being connected in shunt with the impedances $Z_0$ and Z in the bridge arms 12 and 14 respectively.

The impedance value $Z_0$ for the standard impedance in the arm 12, and the corresponding impedances of the power source B and of the output indicator D, are determined by the nature of the system in which the test impedance Z is to be employed. A characteristic impedance $Z_0$ of 50 ohms is most commonly employed in high frequency electronic circuitry, but the present invention is not limited to that value of characteristic impedance.

If the resistance values of the resistors $r$ in the bridge arms 2 and 4 are each equal $Z_0$, and disregarding the shunting resistances 28 and 30, the output voltage across the impedance $Z_0$ of the output indicator D will be proportional to the reflection coefficient of the impedance Z under test. More specifically, that output voltage $V_0$ can be shown to equal $$\frac{V_g}{8}\frac{Z-Z_0}{Z+Z_0}$$

Since $$R=\frac{Z-Z_0}{Z+Z_0}$$

it follows that $$V_0=\frac{V_g}{8}R$$

If, however, the shunting resistors 28 and 30 be taken into consideration, the value of each of these shunting resistors being represented by $R_f$, then $V_0$ can be shown to equal $$V_g\frac{Z_0 r R_f^2(Z-Z_0)}{AZ_0+BZ}$$

where $A=2Z_0 r R_f^2+2r^2 R_f^2+2Z_0^2 r R_f+Z_0 r^2 R_f+3Z_0 r R_f^2+Z_0^2 R_f^2$ and $B=Z_0^2 r^2+2Z_0^3 r+8Z_0^2 r R_f+3Z_0 r^2 R_f$
$\qquad +2Z_0^3 R_f+2Z_0^2 R_f^2+5Z_0 r R_f^2+r^2 R_f^2$ Since we want $V_0$ to be proportional to R, and therefore to $$\frac{Z-Z_0}{Z+Z_0}$$

the terms $r$ and $R_f$ in the numerator of the above expression for $V_0$ are not a source of error. They merely vary the proportionality ratio between $V_0$ and $V_g$, and can be taken care of by appropriate calibration. However, the presence of A and B in the denominator do constitute a potential source of error; only if A and B are equal will the denominator be proportional to $Z+Z_0$.

This may be achieved by changing the value of $r$ from $Z_0$ to $$Z_0\frac{y(y+3)+(1+4y^2+4y^3+y^4)^{1/2}}{1-2y-y^2}$$

where $$y=\frac{Z_0}{R_f}$$

A simplified version of this relationship, useful for rough and ready calculation but not as accurate as the full expression, is $r=Z_0(1+5y)$.

To take a specific example, normally in a bridge design for measuring impedances having a characteristic impedance of 50 ohms, the resistors in the arms 2 and 4 of the bridge would have a resistance value of 50 ohms. In a system where the effective shunting resistances 28 and 30 had a value of 1650 ohms, by changing the value of the resistors in the arms 2 and 4 from 50 ohms to 58.5 ohms, in accordance with the expression set forth above, the measured reflection coefficient would not differ by more than .5 db as between open circuited and short circuited conditions for the impedance Z under test, over a wide high frequency range such as 3–1500 megacycles per second, whereas if the resistances in the arms 2 and 4 had remained at their standard value of 50 ohms, in accordance with prior teachings, the comparable change in measured reflection coefficient would be up to four times as great at high reflection coefficients, or in excess of 2 db.

Thus through a simple modification of known circuitry a very greatly increased accuracy is achieved.

It must be borne in mind that the error-creating shunt resistances 28 and 30 are present to a greater or lesser degree with different types of connections C between the bridge circuit A and the output indicator D, and are not solely characteristic of the specific type of coupling transformer C here disclosed, and that the teachings of the present invention are applicable to reducing the error created by those shunting resistors 28 and 30 no matter how those resistors 28 and 30 are effectively produced. It will further be appreciated that the specific details of the power source B and of the output indicator D do not form a part of the present invention, and that they may vary widely in specific construction, all as is well known in the art. The bridge circuit A and the transformer C are also here shown in more or less idealized form, and specific variations may be made therein, all as is well known in the art.

I claim:

1. In a bridge circuit network comprising first, second, third and fourth arms, said first and second arms comprising resistors of substantially the same value resistance $r$, said third arm comprising a standard impedance having an impedance $Z_0$, and said fourth arm comprising a test impedance the reflection coefficient of which is to be measured, and means for detecting a voltage across the signal points on said bridge between said first and fourth arms and said second and third arms respectively, said circuit including effective resistances $R_f$ substantially in shunt with said standard impedance and said test impedance respectively; the improvement which comprises utilizing in said first and second arms resistors having a resistance value $r$ equal substantially to $$Z_o \frac{y(y+3)+(1+4y^2+4y^3+y^4)^{1/2}}{1-2y-y^2}$$

where $$y = \frac{Z_o}{R_f}$$

2. The network of claim 1, in which the value of $r$ substantially equals the simplified relationship $Z_o(1+5y)$, where $Z_o \ll R_f$.

3. The network of claim 2, in which said voltage detecting means comprises a transmission line transformer carrying a plurality of elements thereon of high magnetic permeability.

4. The network of claim 1, in which said voltage detecting means comprises a transmission line transformer carrying a plurality of elements thereon of high magnetic permeability.

References Cited

UNITED STATES PATENTS

| | | |
|---|---|---|
| 2,164,701 | 7/1939 | Cohen. |
| 2,416,790 | 3/1947 | Barrow. |
| 2,790,143 | 4/1957 | Kyhl. |
| 2,798,197 | 7/1957 | Thurston. |
| 2,498,548 | 2/1950 | Howard _____ 250—39.2 |
| 2,798,197 | 7/1957 | Thurston _____ 324—58.5 |

FOREIGN PATENTS 1,016,784  1/1966  Great Britain.

RUDOLPH V. ROLINEC, Primary Examiner

P. F. WILLE, Assistant Examiner